United States Patent
Quintero et al.

(10) Patent No.: US 11,661,543 B2
(45) Date of Patent: May 30, 2023

(54) INJECTION WELL CLEANING FLUIDS AND RELATED METHODS

(71) Applicant: Baker Hughes Oilfield Operations LLC, Houston, TX (US)

(72) Inventors: Lirio Quintero, Houston, TX (US); Jeffrey A. Russek, Pearland, TX (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 0 days.

(21) Appl. No.: 17/167,307

(22) Filed: Feb. 4, 2021

(65) Prior Publication Data

US 2022/0243115 A1  Aug. 4, 2022

(51) Int. Cl.
C09K 8/528 (2006.01)
E21B 37/06 (2006.01)

(52) U.S. Cl.
CPC .............. *C09K 8/528* (2013.01); *E21B 37/06* (2013.01)

(58) Field of Classification Search
None
See application file for complete search history.

(56) References Cited

U.S. PATENT DOCUMENTS

| | | | | |
|---|---|---|---|---|
| 2,530,757 A | * | 11/1950 | Bransky | C07C 303/44 562/33 |
| 3,444,087 A | * | 5/1969 | Yates | C11D 3/06 510/340 |
| 3,977,471 A | * | 8/1976 | Gale | C09K 8/584 507/938 |
| 4,544,033 A | * | 10/1985 | Ukigai | C09K 8/584 166/270.1 |
| 4,549,607 A | * | 10/1985 | Morita | C09K 8/584 507/938 |
| 5,488,148 A | * | 1/1996 | Weerasooriya | C07C 303/06 562/123 |
| 7,258,170 B2 | | 8/2007 | Nguyen et al. | |
| 8,211,836 B2 | | 7/2012 | Ke et al. | |
| 9,944,842 B2 | | 4/2018 | Quintero et al. | |
| 2009/0203557 A1 | * | 8/2009 | Barnes | C09K 8/584 507/266 |
| 2014/0073541 A1 | * | 3/2014 | Ravikiran | C09K 8/584 507/254 |
| 2016/0177173 A1 | * | 6/2016 | Kunkeler | C09K 8/584 507/254 |
| 2016/0311744 A1 | | 10/2016 | Weerasooriya et al. | |
| 2017/0051195 A1 | * | 2/2017 | Vanzin | C09K 8/62 |
| 2017/0066960 A1 | * | 3/2017 | Crom | C09K 8/584 |

FOREIGN PATENT DOCUMENTS

| | | |
|---|---|---|
| EP | 3162872 A1 | 5/2017 |
| WO | 2014151419 A1 | 9/2014 |
| WO | 2014193720 A1 | 12/2014 |

* cited by examiner

*Primary Examiner* — John J Figueroa
(74) *Attorney, Agent, or Firm* — Crowe & Dunlevy, P.C.

(57) ABSTRACT

Methods can include introducing a cleaning fluid into a near-wellbore zone of an injection well penetrating a subterranean formation, wherein the cleaning fluid includes: 0.5 wt % to about 5 wt % of a surfactant blend comprising an alkoxy carbonate surfactant and an internal olefin sulfonate surfactant; salt water having a total dissolved solids (TDS) of about 15,000 mg/L or greater; and 0 wt % to about 0.05 wt % of an organic acid; and dispersing a hydrocarbon from the near-wellbore zone in the cleaning fluid. Compositions for cleaning a near-wellbore zone of a subterranean formation can include 0.5 wt % to about 5 wt % of a surfactant blend comprising an alkoxy carbonate surfactant and an internal olefin sulfonate surfactant; salt water having a total dissolved solids (TDS) of about 15,000 mg/L or greater; and 0 wt % to about 0.05 wt % of an organic acid.

13 Claims, No Drawings

INJECTION WELL CLEANING FLUIDS AND RELATED METHODS

FIELD

The present disclosure relates to fluids and methods for cleaning a near-wellbore zone of a subterranean formation with the aim of restoring and/or improving the injection permeability. More specifically, said methods use injection wells with the aim of improving the permeability of the near-wellbore zone for the purpose of water injection and/or injection of chemical solutions into the subterranean formation.

BACKGROUND

Generally, enhanced oil recovery (EOR) operations are sophisticated procedures where chemical solutions, gas, and/or thermal energy is injected into a subterranean formation. In water flood and EOR production methods, one of the key factors is maximum injection well performance. The amount of fluid that can be injected into the formation at an injection well depends on, among other things, the permeability and wettability of the rock at the start of and over the life of the injection process. When injection wells fail to achieve expected water and/or chemical solution injection rates, project economics suffer. Impaired injection performance may lead to inadequate voidage replacement, resulting in lower ultimate recovery and failed project.

The EOR procedures may actually be initiated at any time after the primary productive life of an oil formation when the oil production begins to decline. The efficiency of EOR operations may depend on formation temperature, pressure, depth, net pay, permeability, residual oil and water saturations, porosity, fluid properties (e.g., oil American Petroleum Institute (API) gravity and viscosity), injection method (chemical, gas, and/or thermal), and the like.

Primary methods of oil recovery use the natural energy of the formation to produce oil or gas. Primary methods do not require external fluids or heat as a driving energy. Some secondary and the tertiary oil recovery methods are used to inject materials into the formation that are not normally present in the formation, to produce additional oil or gas from the formation. Secondary and tertiary methods may be necessary when the primary recovery operation leaves behind a substantial quantity of hydrocarbons in the subterranean formation.

The secondary methods of oil recovery include horizontal or infill drilling, conformance control, stimulation, and/or injection of fluids into the formation. The injection of fluids, such as water and/or gas, aim to re-pressurize the formation and/or increase the oil displacement. Tertiary oil recovery includes the injection of special fluids, such as chemicals, miscible gases and/or thermal energy. The chemical EOR operations may follow after the secondary operations and modify viscous forces and/or interfacial forces to increase the hydrocarbon oil recovery. The recovery of the incremental oil from the remaining hydrocarbons in the subterranean formation may be enhanced by the injection of fluids into the subterranean formation through one or more injection wells penetrating the subterranean formation, whereby the injection fluids drive the hydrocarbons to one or more producing wells penetrating the subterranean formation. EOR operations are typically performed by injecting the fluid through the injection well into the subterranean formation to increase the mobility ratio and/or capillary number, in order to improve oil displacement or fluid flow in the formation, and the like.

Suitable injection fluids for EOR include, among other things, water, steam, carbon dioxide, and natural gas. Additionally, suitable injection fluids for chemical EOR include water combined with one or more of the following chemicals additives: surfactants, polymers, alkali compounds, and nanoparticles. In the case of water flood as a secondary method of oil recovery, the preferred injection fluid is typically water. In particular, where the subterranean formation contains high permeability zones, the water injection may flow through the areas of least resistance (e.g., through the high permeability zone), thereby bypassing less permeable zones. Chemical EOR operations may provide the injection fluid properties necessary to mobilize the hydrocarbons from the high permeability zones to the production well(s).

Examples of water flooding and chemical EOR operations may be or include, polymer flooding, ASP (alkali/surfactant/polymer) flooding, SP (surfactant/polymer) flooding, surfactant flooding, low salinity water, microbial EOR, and the like. Further, foam injection, which a hybrid method that combines chemical EOR and gas injection methods, may be used is such operations.

Water flood and chemical EOR operations use water in the injection operations. The fluid flow through the near-wellbore zone of a formation may be limited due to reduction of permeability or near-wellbore zone damage caused by multiple mechanisms such as inorganic deposits and organic deposits. Typically, inorganic deposits are mainly salts that precipitate due to pressure changes, temperature changes, and/or an incompatible mixture of water with different salts and concentration of salts. Examples of salts that tend to precipitate and cause inorganic deposits include sulfate salts, carbonate salts, halide salts, and combinations of these that can cause scale. Scale can obstruct injection flow in the wellbore and/or in the near-wellbore zone of the formation. The organic deposits are formed from the residual particles of oil in the injection water. The oil may be present in the rock and also covering the surface of the scale deposits. In addition, the formation could have a residual oil saturation that makes the rock surface oil-wet, thus it restricts the fluid injection.

BRIEF DESCRIPTION

The present disclosure relates to fluids and methods for cleaning a near-wellbore zone of the formation with the aim of restoring and/or improving the injection permeability. More specifically, said methods use injection wells with the aim of improving the permeability of the near-wellbore zone so that subsequent water injection and/or injection of chemical solutions into the subterranean formation may be more effective.

A first nonlimiting example is a composition comprising: 0.5 wt % to about 5 wt % of a surfactant blend comprising an alkoxy carbonate surfactant and an internal olefin sulfonate surfactant; salt water having a total dissolved solids (TDS) of about 15,000 mg/L or greater; 0 wt % to about 0.05 wt % of an organic acid; and wherein the composition has an interfacial tension at 60° C. with crude oil having a viscosity 2.5 cP at 60° C. and viscosity of 0.5 cP at 90° C. of about 0.1 mN/m or less.

The first nonlimiting example embodiment may include one or more of the following: (a) wherein the alkoxy carbonate surfactant comprises a surfactant according to Formula I (see below); (b) wherein the alkoxy carbonate surfactant comprises a surfactant according to Formula II (see below); (c) wherein the internal olefin sulfonate surfactant comprises a surfactant according to Formula III (see below); (d) wherein the internal olefin sulfonate surfactant comprises a surfactant according to Formula IV (see below); (e) wherein a weight ratio of the alkoxy carbonate surfactant to the internal olefin sulfonate surfactant is about 80:20 to about 20:80; (f) wherein the salt water has a TDS of about 15,000 mg/L to about 50,000 mg/L; (g) wherein the organic acid is present and comprises one or more selected from the group consisting of: acetic acid, formic acid, glycolic acid, lactic acid, succinic acid, malic acid, oxalic acid, citric acid, benzoic acid, salicylic acid, butyric acid, ascorbic acid, and any combination thereof; (h) wherein the organic acid is present at about 0.001 wt % to about 0.05 wt % of the cleaning fluid.

A second nonlimiting example is a method comprising: introducing a cleaning fluid into a near-wellbore zone of an injection well penetrating a subterranean formation, wherein the cleaning fluid comprises: 0.5 wt % to about 5 wt % of a surfactant blend comprising an alkoxy carbonate surfactant and an internal olefin sulfonate surfactant; salt water having a total dissolved solids (TDS) of about 15,000 mg/L or greater; 0 wt % to about 0.05 wt % of an organic acid; and wherein the composition has an interfacial tension at 60° C. with a crude oil having a viscosity 2.5 cP at 60° C. and a viscosity of 0.5 cP at 90° C. of about 0.1 mN/m or less; and dispersing a hydrocarbon from the near-wellbore zone in the cleaning fluid.

The second nonlimiting example embodiment may include one or more of the following: (a) the method further comprising: shutting in the cleaning fluid in the near-wellbore zone; (b) the method further comprising: introducing an acidizing fluid into the near-wellbore zone after injecting the cleaning fluid, wherein the acidizing fluid comprises water and a sufficient amount of an acid to cause the acidizing fluid to have a pH of about 1.5 to about 5.5; (c) (b) and the method further comprising: shutting in the cleaning fluid in the near-wellbore zone; and shutting in the acidizing fluid in the near-wellbore zone; (d) wherein the injection well has a bottom hole temperature of 150° C. or less; (e) wherein the alkoxy carbonate surfactant comprises a surfactant according to Formula I (see below); (f) wherein the alkoxy carbonate surfactant comprises a surfactant according to Formula II (see below); (g) wherein the internal olefin sulfonate surfactant comprises a surfactant according to Formula III (see below); (h) wherein the internal olefin sulfonate surfactant comprises a surfactant according to Formula IV (see below); (i) wherein a weight ratio of the alkoxy carbonate surfactant to the internal olefin sulfonate surfactant is about 80:20 to about 20:80; (j) wherein the salt water has a TDS of about 15,000 mg/L to about 50,000 mg/L; (k) wherein the organic acid is present and comprises one or more selected from the group consisting of: acetic acid, formic acid, glycolic acid, lactic acid, succinic acid, malic acid, oxalic acid, citric acid, benzoic acid, salicylic acid, butyric acid, ascorbic acid, and any combination thereof; and (k) wherein the organic acid is present at about 0.001 wt % to about 0.05 wt % of the cleaning fluid.

A third nonlimiting example is a method comprising: introducing a cleaning fluid into a near-wellbore zone of an injection well penetrating said subterranean formation, wherein the cleaning fluid comprises: 0.5 wt % to about 5 wt % of a surfactant blend comprising an alkoxy carbonate surfactant and an internal olefin sulfonate surfactant; salt water having a total dissolved solids (TDS) of about 15,000 mg/L or greater; 0 wt % to about 0.05 wt % of an organic acid; a sufficient amount of an acid to cause the cleaning fluid to have a pH of about 1.5 to about 5.5; and wherein the composition has an interfacial tension at 60° C. with a crude oil having a viscosity 2.5 cP at 60° C. and viscosity of 0.5 cP at 90° C. of about 0.1 mN/m or less; dispersing hydrocarbon from the near-wellbore zone into the cleaning fluid.

The third nonlimiting example embodiment may include one or more of the following: (a) wherein the injection well has a bottom hole temperature of 150° C. or less; (b) wherein the alkoxy carbonate surfactant comprises a surfactant according to Formula I (see below); (c) wherein the alkoxy carbonate surfactant comprises a surfactant according to Formula II (see below); (d) wherein the internal olefin sulfonate surfactant comprises a surfactant according to Formula III (see below); (e) wherein the internal olefin sulfonate surfactant comprises a surfactant according to Formula IV (see below); (f) wherein a weight ratio of the alkoxy carbonate surfactant to the internal olefin sulfonate surfactant is about 80:20 to about 20:80; (g) wherein the salt water has a TDS of about 15,000 mg/L to about 50,000 mg/L; (h) wherein the organic acid is present and comprises one or more selected from the group consisting of: acetic acid, formic acid, glycolic acid, lactic acid, succinic acid, malic acid, oxalic acid, citric acid, benzoic acid, salicylic acid, butyric acid, ascorbic acid, and any combination thereof; and (i) wherein the organic acid is present at about 0.001 wt % to about 0.05 wt % of the cleaning fluid.

DETAILED DESCRIPTION

The present disclosure relates to fluids and methods for cleaning a near-wellbore zone of the formation with the aim of restoring and/or improving the injection permeability. More specifically, said methods use injection wells with the aim of improving the permeability of the near-wellbore zone for the purpose of water injection and/or injection of chemical solutions into the subterranean formation.

The present disclosure provides compositions and methods that use high salinity, water-based fluid (e.g., having 15,000 mg/L or greater total dissolved solids) for near-wellbore zone cleaning. The surfactant blends described herein include an alkoxy carbonate surfactant and an internal olefin sulfonate surfactant. The blend of these surfactants, optionally also in the presence of an organic acid, may yield a higher salinity, water-based fluid with very low interfacial tension. Said fluid may be suitable as a cleaning fluid that is pumped downhole and allowed to soak the near-wellbore zone for a period of time. After the soaking period of time, the oil and/or organic deposit in the near-wellbore zone may be reduced or removed, which leaves the formation water-wet and, consequently, increases the injection permeability. Without being limited by theory, it is believed that when scale is also present in the near-wellbore zone, the surfactant blend may remove the oil from the surface of the scale and turn the scale water-wet, which allows for more effective scale removal operations (e.g., pumping an acid treatment downhole after the surfactant blend soaking period). As a result of cleaning with the compositions and methods described herein, the water injection and/or chemical fluid injection rates to a subterranean formation at an injection well may be increased.

Without being limited by theory, it is believed that the low interfacial tension allows the cleaning fluid to remove oil into the single phase fluid when contacting and incorporating oil present in rock during an injection well cleaning operation. That is, it is believed that the micelles disperse the oil into the core of the micelles, creating a microemulsion. Further, oil may be removed from surfaces (e.g., equipment surfaces, rock surfaces, and/or scale surfaces) during the cleaning process by a "roll-up" mechanism in a detergency process.

The cleaning fluids and related methods described herein may be used or performed in conjunction with (e.g., in sequence with or simultaneous to) other near-wellbore zone cleaning methods such as scale removal from the near-wellbore zone and/or the downhole equipment.

Definitions

As used herein, the term "alkyl" refers to a straight or branched carbon and hydrogen containing chain that is saturated.

As used herein, the term "cyclo-alkyl" refers to a straight or branched carbon and hydrogen containing chain that is saturated and contains one or more cyclo groups of any suitable carbon number therein.

As used herein, the term "cyclo-aryl" refers to a straight or branched carbon and hydrogen containing chain that is saturated and contains one or more aromatic cyclic groups (also referred to as aryl groups) of any suitable carbon number therein. Said aromatic cyclic groups may be a single ring or multiple, fused rings.

As used herein, the terms "total dissolved solids" and "TDS" refers to the amount of dissolved solids in water. As used herein, the term "dissolved solids" refers to any minerals, salts, metals, cations, or anions dissolved in water. TDS comprise inorganic salts that are principally composed of calcium, magnesium, potassium, sodium, barium, bicarbonates, chlorides, and sulfates.

TDS is a measure of the amount of material dissolved in water. This material can include carbonate, bicarbonate, chloride, sulfate, phosphate, nitrate, calcium, magnesium, sodium, organic ions, or other ions. To measure TDS, an aqueous sample is filtered through a 0.45 micron filter, and then the filtrate is evaporated in a pre-weighed dish and dried in an oven at 180° C., until the weight of the dish no longer changes. The increase in weight of the dish represents the total dissolved solids.

As used herein, the term "near-wellbore zone" refers to a volume of a subterranean formation extending up to about 3 feet from the wall of the wellbore into the subterranean formation. It should be noted that introducing a fluid into a near-wellbore zone does not limit a maximum penetration to 3 feet. That is, a fluid introduced into a near-wellbore zone may penetrate 5 feet or more into the formation.

As used herein, the terms "dispersing" and "dispersion" and grammatical variations thereof refer to distributing or a distribution of one material into another and do not imply a specific mechanism by which the distributing occurs or the distribution is maintained. For example, solubilizing, suspending, and/or other mechanisms may be involved in dispersing one fluid into another fluid.

Cleaning Fluids and Related Methods

A cleaning fluid of the present disclosure may comprise (a) about 0.5 wt % to about 5 wt % of a surfactant blend, (b) salt water having a TDS of about 15,000 mg/L or greater, and (c) 0 wt % to about 0.05 wt % of an organic acid. A cleaning fluid of the present disclosure may consist of (a) about 0.5 wt % to about 5 wt % of a surfactant blend, (b) salt water having a TDS of about 15,000 mg/L or greater, and (c) 0 wt % to about 0.05 wt % of an organic acid. The cleaning fluid of the present disclosure, before contacting the near-wellbore zone of a subterranean formation, is preferably a single phase fluid. However, if present, the discontinuous phase is preferably about 1 wt % or less (or about 0.5 wt % or less, or about 0.1 wt % or less) of the cleaning fluid.

The surfactant blend may reduce the interfacial tension between the cleaning fluid with oil. The cleaning fluid may have an interfacial tension at 60° C. with a crude oil having viscosity 2.5 cP at 60° C. and viscosity of 0.5 cP at 90° C. of about 0.1 mN/m or less (or about 0.001 mN/m to about 0.1 mN/m, or about 0.07 mN/m or less, or about 0.001 mN/m to about 0.07 mN/m, or about 0.05 mN/m or less, or about 0.001 mN/m to about 0.05 mN/m, or about 0.01 mN/m or less, or about 0.001 mN/m to about 0.01 mN/m, or about 0.005 mN/m or less, or about 0.001 mN/m to about 0.005 mN/m). Unless otherwise specified, interfacial tension is determined using a spinning drop tensiometer at a temperature of 60° C.

The salt water preferably has a TDS of about 15,000 mg/L or greater (or about 15,000 mg/L to about 100,000 mg/L, or about 15,000 mg/L to about 50,000 mg/L, or about 25,000 mg/L to about 45,000 mg/L, or about 30,000 mg/L to about 50,000 mg/L, or about 40,000 mg/L to about 100,000 mg/L). It should be noted that the surfactant blend will add to the TDS of the overall cleaning fluid. In the foregoing TDS values, the surfactant blend is not accounted for.

The surfactant blend may comprise an alkoxy carbonate surfactant and an internal olefin sulfonate surfactant. The surfactant blend may consist essentially of an alkoxy carbonate surfactant and an internal olefin sulfonate surfactant.

Combinations of surfactants according to Formula I, combinations of surfactants according to Formula II, and combinations of surfactants according to Formulas I and II may be used in the cleaning fluid.

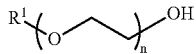

Formula I where $R^1$ is a $C_8$-$C_{24}$ alkyl, a $C_8$-$C_{24}$ cyclo-alkyl, or a $C_8$-$C_{24}$ aryl-alkyl
where n is an integer from 1 to 30

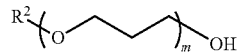

Formula II where $R^2$ is a $C_8$-$C_{24}$ alkyl, a $C_8$-$C_{24}$ cyclo-alkyl, or a $C_8$-$C_{24}$ aryl-alkyl
where m is an integer from 1 to 30.

Examples of alkoxy carbonate surfactants may include, but are not limited to, ethoxylated $C_8$-$C_{24}$ alcohols, propoxylated $C_8$-$C_{24}$ alcohols, ethoxylated-propoxylated $C_8$-$C_{24}$ alcohols, and the like, and any combination thereof. In each of the foregoing, a number of ethoxylate group, when present, may be about 1 to about 100 ethylene oxide units, and/or a number of propoxylate group, when present, may be about 1 to about 100 propylene oxide units. Commercial examples include, but are not limited to, ASPIRO™ S 8710 (a mixture of alkoxy carbonate surfactants, available from BASF), and the like, and any combination thereof.

Internal olefin sulfonate surfactants may be according to Formula III or Formula IV. Combinations of surfactants according to Formula III, combinations of surfactants according to Formula IV, and combinations of surfactants according to Formulas III and IV may be used in the cleaning fluid.

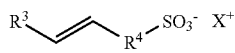

Formula III where $R^3$ is a $C_1$-$C_{20}$ alkyl, a $C_1$-$C_{20}$ cyclo-alkyl, or a $C_1$-$C_{20}$ aryl-alkyl
where $R^4$ is a $C_1$-$C_{20}$ alkyl, a $C_1$-$C_{20}$ cyclo-alkyl, or a $C_1$-$C_{20}$ aryl-alkyl
where $X^+$ is a cation of hydrogen, lithium, sodium, or potassium
preferably the total number of carbons in Formula III is $C_8$-$C_{24}$ (or $C_{12}$-$C_{22}$, or $C_{14}$-$C_{20}$)

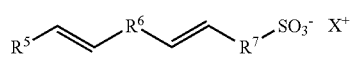

Formula IV where $R^5$ is a $C_1$-$C_{20}$ alkyl, a $C_1$-$C_{20}$ cyclo-alkyl, or a $C_1$-$C_{20}$ aryl-alkyl
where $R^6$ is a $C_1$-$C_{20}$ alkyl, a $C_1$-$C_{20}$ cyclo-alkyl, or a $C_1$-$C_{20}$ aryl-alkyl
where $R^7$ is a $C_1$-$C_{20}$ alkyl, a $C_1$-$C_{20}$ cyclo-alkyl, or a $C_1$-$C_{20}$ aryl-alkyl
where $X^+$ is a cation of hydrogen, lithium, sodium, or potassium
preferably the total number of carbons in Formula IV is $C_8$-$C_{24}$ (or $C_{12}$-$C_{22}$, or $C_{14}$-$C_{20}$).

Examples of internal olefin sulfonate surfactants may include, but are not limited to, alpha olefin sulfonates, alkyl benzene sulfonate, and the like, and any combination thereof. Commercial examples include, but are not limited to, PETROSTEP™ S2 (a mixture of $C_{15}$-$C_{20}$ internal olefin sulfonate surfactants, available from Stepan Co.), and ENORDET™ (internal olefin sulfonate surfactants, available from Shell), and the like, and any combination thereof.

A weight ratio of the alkoxy carbonate surfactant to the internal olefin sulfonate surfactant may be about 80:20 to about 20:80 (or about 80:20 to about 50:50, or about 60:40 to about 40:60, or about 50:50 to about 20:80).

Examples of organic acids include, but are not limited to, acetic acid, formic acid, glycolic acid, lactic acid, succinic acid, malic acid, oxalic acid, citric acid, benzoic acid, salicylic acid, butyric acid, ascorbic acid, and the like, and any combination thereof.

When present, an organic acid may be present in the cleaning fluid at about 0.1 wt % to about 0.05 wt % (or about 0.001 wt % to about 0.05 wt %, or about 0.01 wt % to about 0.05 wt %) based on the total weight of the cleaning fluid.

The cleaning fluids described herein may be useful for increasing the injection permeability of a near-wellbore zone. Accordingly, methods of the present disclosure may include introducing a cleaning fluid of the present disclosure into a near-wellbore zone of an injection well penetrating a subterranean formation; and dispersing a hydrocarbon from the near-wellbore zone into the cleaning fluid. Optionally, the cleaning fluid may be shut-in the near-wellbore zone, which allows for the cleaning fluid to soak the near-wellbore zone and disperse more hydrocarbon in the cleaning fluid.

The ability for the surfactant to stay solubilized and maintain a single phase (or substantially single phase) fluid may depend on the temperature of the cleaning fluid. Without being limited by theory, it is believed that the cleaning fluids described herein are suitable for use in injection wells having a bottom hole temperature at about 150° C. or less (e.g., about 20° C. to about 150° C.). Further, the organic acid may improve the stability at higher temperatures and may preferably be included when the subterranean formation is about 70° to about 150° C.

The cleaning fluids described herein may be used in conjunction with other EOR methods and fluids. Said conjunction may be simultaneous or consecutive. For example, a scale removal functionality may be incorporated into the cleaning fluid. Alternatively or additionally, a fluid suitable for removing scale from a subterranean formation may be used after the cleaning fluid.

Scale removal may be achieved using acidizing fluids. Acidizing fluids may comprise water and an acid and have a pH of about 1.5 to about 5.5 (or about 1.9 to about 4.8, or about 2.5 to about 4.5). The acid may be a single acid or a blend of acids. Examples of acids may include, but are not limited to, hydrofluoric acid (HF), hydrochloric acid (HCl), acetic acid, formic acid, phosphoric acid, and the like, and any combination thereof.

The water of the acidizing fluid may have a total dissolved solids of about 20,000 mg/L or greater (or about 20,000 mg/L to about 50,000 mg/L, or about 20,000 mg/L to about 35,000 mg/L, or about 30,000 mg/L to about 50,000 mg/L).

The acidizing fluid may include other additives that assist with scale removal. For example, a boron-containing compound and a phosphonate compound may be included with hydrofluoric acid (or a hydrofluoric acid source) as described in U.S. Pat. No. 8,211,836. As described therein, it is believed that the boron-containing compound principally functions to inhibit or prevent the formation of fluoride scales or to remove such scales. The phosphonate compound is believed to principally function as a stabilizer.

As described above, methods of the present disclosure may aim to improve (preferably restore) the injection permeability of a near-wellbore zone of an injection well penetrating a subterranean formation. Said methods may include first treating the formation with a cleaning fluid described herein and then treating the formation with an acidizing fluid. For example, methods described herein may comprise: introducing a cleaning fluid of the present disclosure into a near-wellbore zone of an injection well penetrating a subterranean formation; dispersing a hydrocarbon from the near-wellbore zone into the cleaning fluid; and introducing an acidizing fluid into the near-wellbore zone after introducing the cleaning fluid. Optionally, the cleaning fluid and/or the acidizing fluid may be shut-in the near-wellbore zone, which allows for said fluid(s) to soak the near-wellbore zone and clean the near-wellbore zone (e.g., by dispersing hydrocarbon in the cleaning fluid and, if included, dissolving scale in the acidizing fluid).

Alternatively, methods of the present disclosure may aim to improving permeability of a subterranean formation by treating the formation with a cleaning fluid that has additional scale removal functionality. Such a cleaning fluid may comprise: (a) about 0.5 wt % to about 5 wt % of a surfactant blend, (b) salt water having a TDS of about 15,000 mg/L or greater, (c) 0 wt % to about 0.05 wt % of an organic acid, and (d) a sufficient amount of acid to cause the cleaning fluid to have a pH of about 1.5 to about 5.5. The amount of acid added should also not be too much to cause the interfacial tension of the cleaning fluid to be significantly outside the preferred range. That is, a cleaning fluid may comprising: (a) about 0.5 wt % to about 5 wt % of a surfactant blend, (b) salt water having a TDS of about 15,000 mg/L or greater, (c) 0 wt % to about 0.05 wt % of an organic acid, and (d) a sufficient amount of acid to cause the cleaning fluid to have a pH of about 1.5 to about 5.5 may have an interfacial tension at 60° C. with a crude oil having a viscosity 2.5 cP at 60° C. and a viscosity of 0.5 cP at 90° C. of about 0.1 mN/m or less (or about 0.001 mN/m to about 0.1 mN/m, or about 0.07 mN/m or less, or about 0.001 mN/m to about 0.07 mN/m, or about 0.05 mN/m or less, or about 0.001 mN/m to about 0.05 mN/m, or about 0.01 mN/m or less, or about 0.001 mN/m to about 0.01 mN/m, or about 0.005 mN/m or less, or about 0.001 mN/m to about 0.005 mN/m).

Therefore, methods described herein may comprise: introducing a cleaning fluid comprising: (a) about 0.5 wt % to about 5 wt % of a surfactant blend, (b) salt water having a TDS of about 15,000 mg/L or greater, (c) 0 wt % to about 0.05 wt % of an organic acid, and (d) a sufficient amount of acid to cause the cleaning fluid to have a pH of about 1.5 to about 5.5 into a near-wellbore zone of an injection well penetrating a subterranean formation; dispersing hydrocarbon from the near-wellbore zone into the cleaning fluid; and dissolving scale in the near-wellbore zone in the cleaning fluid. Optionally, the methods may further include shutting-in the cleaning fluid in the near-wellbore zone, which allows for the cleaning fluid to soak the near-wellbore zone and disperse more hydrocarbon and dissolve more scale in the cleaning fluid.

The described methods may be combined such that a suitable method comprises: introducing a cleaning fluid comprising: (a) about 0.5 wt % to about 5 wt % of a surfactant blend, (b) salt water having a TDS of about 15,000 mg/L or greater, (c) 0 wt % to about 0.05 wt % of an organic acid, and (d) a sufficient amount of acid to cause the cleaning fluid to have a pH of about 1.5 to about 5.5 into a near-wellbore zone of an injection well penetrating a subterranean formation; introducing an acidizing fluid into the injection well after introducing the cleaning fluid; dispersing hydrocarbon from the near-wellbore zone into the cleaning fluid; and dissolving scale in the near-wellbore zone in the cleaning fluid and in the acidizing fluid. Optionally, the method may further include shutting in the cleaning fluid and/or the acidizing fluid in the near-wellbore zone, which allows for said fluid(s) to soak the near-wellbore zone and clean the near-wellbore zone (e.g., by dispersing hydrocarbon in the cleaning fluid and, if included, dissolving scale in the acidizing fluid). Said shut-in may be a single shut-in after the acidizing fluid is introduced. Alternatively, two shut-ins may be included in the methods with the first after introducing the cleaning fluid but before introducing the acidizing fluid and the second after introducing the acidizing fluid.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

Example 1. Salt water having a composition according to Table 1 was mixed with a mixture of alkoxy carbonate surfactants and a mixture of $C_{15}$-$C_{20}$ internal olefin sulfonate surfactants to yield a cleaning fluid.

TABLE 1

| Component | Amount (mg/L) |
| --- | --- |
| $Na^+$ | 10,955 |
| $K^+$ | 365 |
| $Ca^{2+}$ | 389 |
| $Mg^{2+}$ | 1,384 |
| $Sr^{2+}$ | 0 |
| $Cl^-$ | 19,388 |
| $SO_4^{2-}$ | 3,468 |
| $HCO_3^-$ | 0 |
| TDS | 35,947 |

A sandstone core sample having a pore volume of about 78 mL was used for an injection core flood test per Table 2. Using core flood testing, the permeability of the core sample was determined to be about 165 mD after step 6. The core sample was then water flooded, oil flooded, and water flooded again at 91° C., which reduced the permeability of the core sample to about 10 mD after step 12. After step 12, the core sample is believed to be mimic downhole conditions where oil and water are trapped in the interstitial spaces of the rock. The core sample was then flushed with a cleaning fluid of the present disclosure (step 13) and then treated with an acidizing fluid (step 14). After treating, the permeability of the core sample was 138 mD, which is 13 times greater than at the mimicked downhole conditions.

TABLE 2

| Step | Task | Fluid | Volume (mL) | Rate (mL/min) | Temp. (° C.) |
| --- | --- | --- | --- | --- | --- |
| 1 | Water saturation | 1% KCl | 100 | | 25 |
| 2 | Water flood | 1% KCl | 90 | 0.1 | 25 |
| 3 | Salinity tracer | 4% KCl | 150 | 2 | 25 |
| 4 | Water flood | Salt water (SW) per Table 1 | 90 | 2 | 25 |
| 5 | Heat to 91° C. | — | — | — | 25-91 |
| 6 | Water flood | SW | 75 | 0.5:0.5:2 | 91 |
| 7 | Oil flood | Crude oil | 100 | 20 | 91 |

TABLE 2-continued

| Step | Task | Fluid | Volume (mL) | Rate (mL/min) | Temp. (° C.) |
|---|---|---|---|---|---|
| 8 | Age 2 days | — | — | — | 91 |
| 9 | Oil flood | Crude oil | 70 | 0.33:0.33:2 | 91 |
| 10 | Water flood | SW | 90 | 0.5 | 91 |
| 11 | Water flood | SW | 20 | 0.1:0.1:0.5 | 91 |
| 12 | Water flood | SW | 20 | 0.1:0.1:0.5 | 91 |
| 13 | Pre-flush | 1.6 wt % of the mixture of $C_{15}$-$C_{20}$ internal olefin sulfonate surfactants and 0.4 wt % of the mixture of alkoxy carbonate surfactants in SW | 112.5 | 0.5 | 91 |
| 14 | Main treatment | HCl in water at pH 1.8 | 750 | 0.5 | 91 |
| 15 | Shut in 4 hours | — | — | — | 91 |
| 16 | Water flood | SW | 120 | 0.5 | 91 |
| 17 | Water flood | SW | 75 | 0.5:0.5:2 | 91 |
| 18 | Water flood | SW | 75 | 0.5:0.5:2 | 91 |

Example 2. Samples were prepared with salt water according to Table 1 and varying concentrations of the mixture of $C_{15}$-$C_{20}$ internal olefin sulfonate surfactants and the mixture of alkoxy carbonate surfactants according to Table 3. The interfacial tension of the samples with a crude oil having an API gravity 38°, viscosity 2.5 cP at 60° C., and viscosity of 0.5 cP at 90° C. were measured using a spinning drop tensiometer at 90° C. and are reported in Table 3.

TABLE 3

| Surfactant Weight Ratio (the mixture of $C_{15}$-$C_{20}$ internal olefin sulfonate surfactants to the mixture of alkoxy carbonate surfactants) | Total Surfactant Concentration (wt %) | Interfacial Tension (mN/m) |
|---|---|---|
| 50:50 | 0.3 | 0.002 |
| 60:40 | 0.1 | 0.006 |
| 60:40 | 0.2 | 0.006 |
| 60:40 | 0.3 | 0.004 |
| 60:40 | 0.5 | 0.003 |
| 70:30 | 0.3 | 0.009 |
| 70:30 | 0.5 | 0.009 |
| 75:25 | 0.3 | 0.012 |
| 75:25 | 0.5 | 0.015 |
| 80:20 | 0.1 | 0.028 |
| 80:20 | 0.2 | 0.016 |
| 80:20 | 0.3 | 0.015 |
| 80:20 | 0.5 | 0.021 |

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   introducing a cleaning fluid into a near-wellbore zone of an injection well penetrating a subterranean formation, wherein the cleaning fluid comprises:
   0.5 wt % to about 5 wt % of a surfactant blend comprising an alkoxy carbonate surfactant and an internal olefin sulfonate surfactant;
   salt water having a total dissolved solids (TDS) of about 15,000 mg/L or greater; and
   0 wt % to about 0.05 wt % of an organic acid;
   introducing an acidizing fluid into the near-wellbore zone after injecting the cleaning fluid, wherein the acidizing fluid comprises water and a sufficient amount of an acid to cause the acidizing fluid to have a pH of about 1.5 to about 5.5; and
   dispersing a hydrocarbon from the near-wellbore zone in the cleaning fluid.

2. The method of claim 1 further comprising:
   shutting in the cleaning fluid in the near-wellbore zone.

3. The method of claim 1 further comprising:
   shutting in the cleaning fluid in the near-wellbore zone; and
   shutting in the acidizing fluid in the near-wellbore zone.

4. The method of claim 1, wherein the injection well has a bottom hole temperature of 150° C. or less.

5. The method of claim 1, wherein the alkoxy carbonate surfactant comprises a surfactant according to Formula I

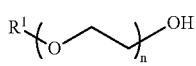

Formula I where $R^1$ is a $C_8$-$C_{24}$ alkyl, a $C_8$-$C_{24}$ cyclo-alkyl, or a $C_8$-$C_{24}$ aryl-alkyl
where n is an integer from 1 to 30.

6. The method of claim 1, wherein the alkoxy carbonate surfactant comprises a surfactant according to Formula II

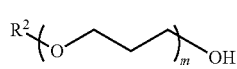

Formula II where $R^2$ is a $C_8$-$C_{24}$ alkyl, a $C_8$-$C_{24}$ cyclo-alkyl, or a $C_8$-$C_{24}$ aryl-alkyl
where m is an integer from 1 to 30.

7. The method of claim 1, wherein the internal olefin sulfonate surfactant comprises a surfactant according to Formula III

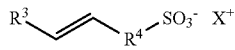

Formula III where $R^3$ is a $C_1$-$C_{20}$ alkyl, a $C_1$-$C_{20}$ cyclo-alkyl, or a $C_1$-$C_{20}$ aryl-alkyl
where $R^4$ is a $C_1$-$C_{20}$ alkyl, a $C_1$-$C_{20}$ cyclo-alkyl, or a $C_1$-$C_{20}$ aryl-alkyl
where $X^+$ is a cation of hydrogen, lithium, sodium, or potassium.

8. The method of claim 1, wherein the internal olefin sulfonate surfactant comprises a surfactant according to Formula I

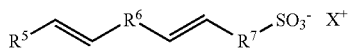

Formula IV where $R^5$ is a $C_1$-$C_{20}$ alkyl, a $C_1$-$C_{20}$ cyclo-alkyl, or a $C_1$-$C_{20}$ aryl-alkyl
where $R^6$ is a $C_1$-$C_{20}$ alkyl, a $C_1$-$C_{20}$ cyclo-alkyl, or a $C_1$-$C_{20}$ aryl-alkyl
where $R^7$ is a $C_1$-$C_{20}$ alkyl, a $C_1$-$C_{20}$ cyclo-alkyl, or a $C_1$-$C_{20}$ aryl-alkyl
where $X^+$ is a cation of hydrogen, lithium, sodium, or potassium.

9. The method of claim 1, wherein a weight ratio of the alkoxy carbonate surfactant to the internal olefin sulfonate surfactant is about 80:20 to about 20:80.

10. A method comprising:
introducing a cleaning fluid into a near-wellbore zone of an injection well penetrating a subterranean formation, wherein the cleaning fluid comprises:
0.5 wt % to about 5 wt % of a surfactant blend comprising an alkoxy carbonate surfactant and an internal olefin sulfonate surfactant;
salt water having a total dissolved solids (TDS) of about 15,000 mg/L or greater;
an acidizing fluid comprising water and an acid selected from the group consisting of hydrofluoric acid, hydrochloric acid, acetic acid, formic acid, phosphoric acid, and combinations thereof, where the acid is present in a sufficient amount to cause the acidizing fluid to have a pH of about 1.5 to about 5.5; and
dispersing hydrocarbon from the near-wellbore zone into the cleaning fluid.

11. The method of claim 10 where the acid is an organic acid and the organic acid is present at about 0.001 wt % to about 0.05 wt %.

12. A method comprising:
introducing a cleaning fluid into a near-wellbore zone of an injection well penetrating a subterranean formation, wherein the cleaning fluid comprises:
0.5 wt % to about 5 wt % of a surfactant blend comprising an alkoxy carbonate surfactant and an internal olefin sulfonate surfactant;
salt water having a total dissolved solids (TDS) of about 15,000 mg/L or greater; and
introducing an acidizing fluid into the near-wellbore zone after injecting the cleaning fluid, wherein the acidizing fluid comprises water and a sufficient amount of an acid to cause the acidizing fluid to have a pH of about 1.5 to about 5.5, where the acid in the acidizing fluid is selected from the group consisting of hydrofluoric acid, hydrochloric acid, acetic acid, formic acid, phosphoric acid, and combinations thereof; and
dispersing a hydrocarbon from the near-wellbore zone in the cleaning fluid.

13. The method of claim 12 where the acidizing fluid has a pH of about 1.9 to about 4.8.

* * * * *